United States Patent
Sato

(10) Patent No.: US 7,602,409 B2
(45) Date of Patent: Oct. 13, 2009

(54) METHOD FOR FORMING 2-DIMENSIONAL CODE BY LASER MARKING AND LASER MARKING DEVICE

(75) Inventor: Kazuo Sato, Aizuwakamatu (JP)

(73) Assignee: Arai Corporation (JP)

( * ) Notice: Subject to any disclaimer, the term of this patent is extended or adjusted under 35 U.S.C. 154(b) by 540 days.

(21) Appl. No.: 11/587,532

(22) PCT Filed: Apr. 26, 2005

(86) PCT No.: PCT/JP2005/008400

§ 371 (c)(1),
(2), (4) Date: Oct. 25, 2006

(87) PCT Pub. No.: WO2005/104005

PCT Pub. Date: Nov. 3, 2005

(65) Prior Publication Data

US 2007/0279474 A1    Dec. 6, 2007

(30) Foreign Application Priority Data

Apr. 26, 2004  (JP) ............................. 2004-129745

(51) Int. Cl.
  *G06K 1/12* (2006.01)
  *B23K 26/00* (2006.01)
  *B41J 2/435* (2006.01)
(52) U.S. Cl. ....................................................... 347/224
(58) Field of Classification Search ................. 347/111, 347/224
See application file for complete search history.

(56) References Cited

U.S. PATENT DOCUMENTS

| | | | | |
|---|---|---|---|---|
| 4,939,354 A | * | 7/1990 | Priddy et al. | 235/456 |
| 5,260,542 A | | 11/1993 | Ishiguro et al. | 210/121.68 |
| 6,164,552 A | * | 12/2000 | Sato | 235/494 |
| 6,218,199 B1 | * | 4/2001 | Sato | 438/14 |
| 6,681,055 B1 | * | 1/2004 | Sato | 382/275 |
| 2007/0038464 A1 | * | 2/2007 | Sato et al. | 705/1 |
| 2007/0086822 A1 | * | 4/2007 | Sato | 400/129 |

FOREIGN PATENT DOCUMENTS

| | | | |
|---|---|---|---|
| EP | 1758045 | * | 2/2007 |
| JP | 07-125312 | | 5/1995 |
| JP | 2003-291535 | | 5/1995 |
| JP | 2001043297 | * | 2/2001 |
| JP | 2004-038328 | | 2/2004 |

OTHER PUBLICATIONS

Computer-generated translation of JP 2003-291535, published on Oct. 15, 2003.*
Computer-generated translation of JP 2004-38328, published on Feb. 5, 2004.*
Computer-generated translation of JP 2001-043297, published on Feb. 2001.*

* cited by examiner

*Primary Examiner*—Huan H Tran
(74) *Attorney, Agent, or Firm*—Bacon & Thomas, PLLC

(57) ABSTRACT

It is judged whether a marking unit formed on a material becomes a bright mark or a dark mark. Based on this judgment, for the work W of a material in which the marking unit becomes a bright mark, the code symbol of the 2-dimensional code of the original image is bright/dark-reversed to generate a reversed code symbol 1R. By doing this, a laser marker 10 is controlled so as to apply a laser beam to the cell of the background portion without applying the laser beam on the cell of the code portion. On the other hand, in the case of the normal material in which the marking unit becomes a dark mark, the laser marker 10 is controlled to apply the laser beam to the cell of the code portion without applying the beam to the cell of the background portion.

19 Claims, 13 Drawing Sheets

Fig. 8
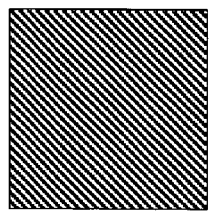 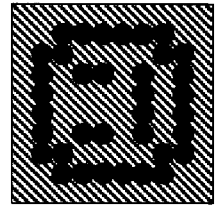 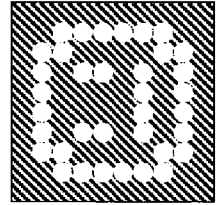
(A) Body color of marked material
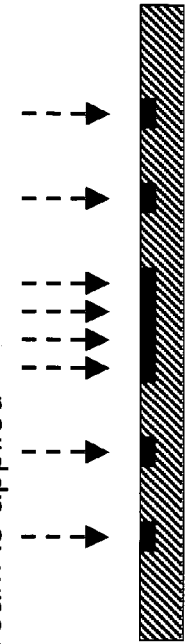
(B) Dark color is generated on portion on which laser beam is applied
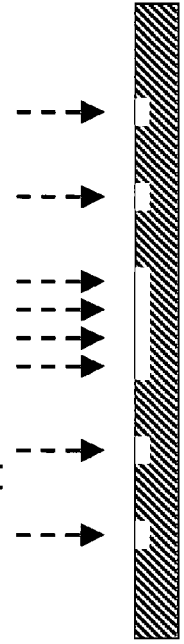
(C) Bright color is generated on portion on which laser beam is applied Fig. 9
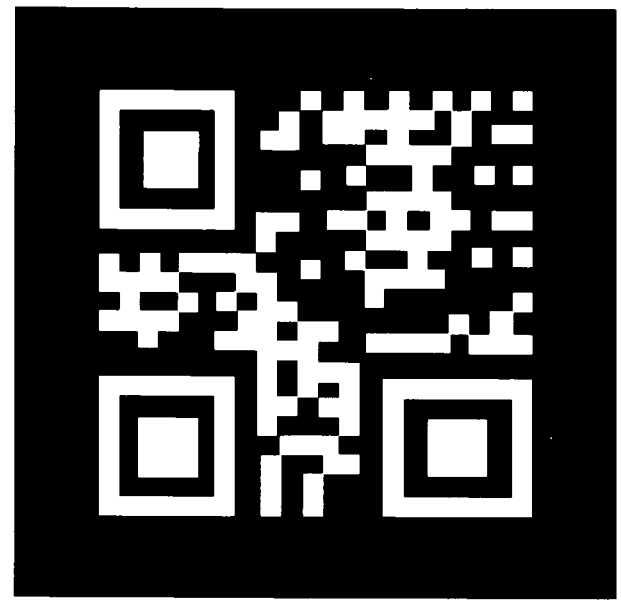
(B)
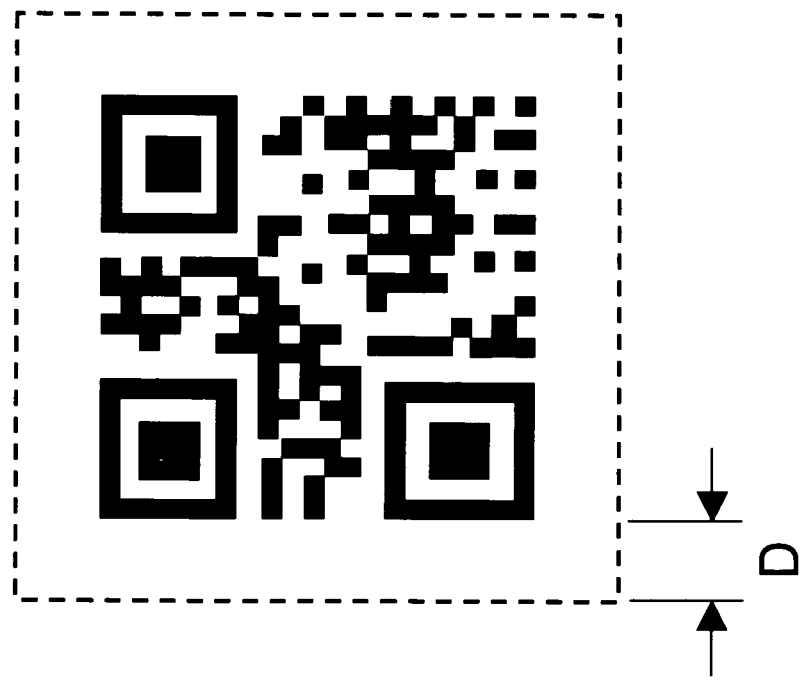
(A)
D Fig.10
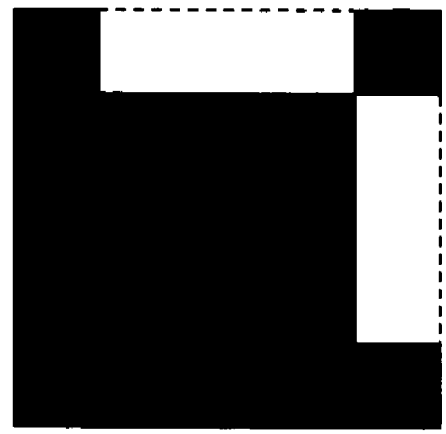
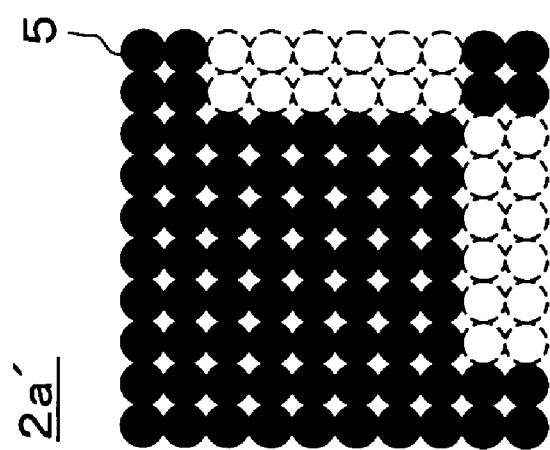

METHOD FOR FORMING 2-DIMENSIONAL CODE BY LASER MARKING AND LASER MARKING DEVICE

FIELD OF THE INVENTION

The present invention relates to a method for forming 2-dimensional code by laser marking and a laser marking device, in particular to a method for forming 2-dimensional code that is possible to form 2-dimensional code not bright/dark-reversed by laser marking and a laser marking device.

BACKGROUND OF THE INVENTION

Conventionally, when forming a 2-dimensional code by laser marking, a marking pattern has been formed by applying a laser beam to a black cell (a portion with a code color) and not applying the laser beam to a white cell (portion with a background color) constructing a code symbol of 2-dimensional code.

As described above, when the laser beam is applied, a portion where the laser beam is applied generates a color and a portion where the laser is not applied remains a material's color, which generates a contrast of bright and dark between the color generated portion and the material's color remained portion. In this way, 2-dimensional code has been formed by a marking pattern having a bright/dark portions consisting of the colored cells and the cells having the material's color on a surface of a material.

In addition, when reading the 2-dimensional code generated by laser marking, a pattern having a bright/dark contrast consisting of the colored cells and the cells having the material's color has conventionally been taken in using CCD cameras or laser scanners and made a reading device recognized as an image data.

In such a method for generating 2-dimensional code, when a portion where the laser beam is applied expresses a darker color than a color where the laser beam is not applied, that is, the material's color, a portion assumed as the cell having a dark color in a code symbol of 2-dimensional code of original image becomes a dark mark even in a marking pattern formed on the surface of material.

That is, as shown in FIG. 8(B), on a material on which a portion where the laser beam is applied, that is, a marking portion by laser marking expresses a dark mark, 2-dimensional code just like an original image in which the code portion expresses a dark mark as shown in FIG. 9(A) is formed.

On the other hand, depending on materials on which a marking is executed, such a case that a portion where the laser beam is applied expresses a brighter color than the material's color may occur. For example, when Aluminum material is laser marked, a portion where the laser beam is applied generates a white color resulting in generation of bright mark. In general, in such materials as a transparent material such as glass, metal, resin, cloth, ceramics and silicon, a marked portion generates a bright color.

That is, as shown in FIG. 8(C), on a material on which a marking portion expresses a bright mark, a bright/dark-reversed image in which the code portion expresses a bright mark as shown in FIG. 9(B), that is, a reversed 2-dimensional code is formed.

In this way, when 2-dimensional code is formed by laser marking, a bright/dark-reversed 2-dimensional code may be formed depending on kind of material to be marked. Thus, in the reading device for reading the laser marked 2-dimensional code have been equipped with bright/dark reversing function.

In such reading device, it is general to read 2-dimensional code with a mutual conversion method in which, after taking-in an image data of bright/dark reversed 2-dimensional code, a color of a portion recognized as a dark mark (material's color to be marked) is converted to a bright color to recognize it, and at the same time, a color of a portion recognized as a bright mark (a portion where white color is generated by laser beam application) is converted to a dark color to recognize it.

In contrast, as a method for forming a barcode by printing, a barcode printing is known that is possible to print a barcode that can be correctly read out the pattern even if the barcode has been generated as a combination of a white system printer ribbon and a black system background (for example, refer to FIG. 1 of page-2 and FIG. 21 of page-7 in Patent Gazette "Tokukaihei 7-125312").

A barcode printer described in the Patent Gazette "Tokukaihei 7-125312" is equipped with a data conversion means that converts a dot pattern data for printing the barcode to a black/white reversed dot pattern data for printing the reversed barcode. This data conversion means executes data conversion of dot pattern data for printing when an ink color is white system and a background color is dark system based on colors of printer ribbon and background detected by a color recognition means. Thereby, it is comprised so as to be possible to accurately print the not-reversed barcode at any time.

However, in 2-dimensional code formation technology by laser marking, it has not been executed to form always the non-reversed 2-dimensional code against the marked materials of any kind by executing a bright/dark conversion of 2-dimensional code's marking data corresponding to the marked materials. Instead, as described above, it has been possible to correctly read out the 2-dimensional code similarly to ordinary 2-dimensional code even if it is a bright/dark revered code by adding a bright/dark reversing function mostly to the reading device side.

Further, when it is required to use either an ordinary reading device or a reading device equipped with bright/dark reversing function depending on the type of material, there have been a problem of lack of convenience. In addition, if it is always required to use the highly functional reading device equipped with bright/dark reversing function, there has been a problem of cost increase.

In general, it is necessary to keep a margin of space with a predetermined dimension around a code symbol of 2-dimensional code. Such margin is called as a "quiet zone". Required size of this margin changes depending on code. For example, in case of QR code, a margin of width corresponding to four cells is required.

When non-reversed 2-dimensional code is formed by laser marking, and an area with a body color or bright color area is reserved around the 2-dimensional code, this bright color area becomes a quiet zone. But, when bright/dark reversed 2-dimensional code is formed, a body color area surrounding this 2-dimensional code becomes a code color (dark color) area. That is, no quiet zone is formed around the bright/dark reversed 2-dimensional code. Thus, in case of bright/dark reversed 2-dimensional code, there has been such a problem that boundary of area in which 2-dimensional code has been marked is hard to be accurately recognized and it becomes impossible to execute reading the 2-dimensional code.

Furthermore, when executing laser marking against a transparent material such as glass or liquid crystal, for example, in general, a portion where laser beam is applied generates white color and becomes a bright mark and a portion where a transparent body is remained as it is becomes a dark portion to form a bright/dark reversed 2-dimensional code. However, a body color of transparent material is recognized differently affected by some objects or light source located at behind the transparent material. Therefore, for example, when the object behind the transparent material is something white, contrast between the color generated portion by laser beam and the body portion where laser beam is not applied becomes small, thereby the boundary of this portion becomes hard to be recognized when 2-dimensional code is taken in as an image data by CCD camera or laser scanner, etc.

That is, when executing laser marking against the transparent material and if the transparent material is located on bright background, a marking pattern becomes unclear and the area in which 2-dimensional code is marked becomes unclear. Thus, such a problem that read out of 2-dimensional code becomes impossible occurs. In order to enable to read out surely the 2-dimensional code, it has been required to make the boundary of area in which 2-dimensional code exists clear.

In view of the above described problems, the objective of this invention is to provide a method for generating 2-dimensional code by laser marking and a laser marking device that is possible to form a non-reversed 2-dimensional code.

Another objective of this invention is to provide a method for forming 2-dimensional code by laser marking and a laser marking device that is possible to surely read out the 2-dimensional code by making the boundary of laser marked 2-dimensional code's area clear.

DISCLOSURE OF THE INVENTION

Method for forming 2-dimensional code by laser marking relating to this invention comprises of a color information acquiring process to acquire the generated color information for judging whether a generated color of a portion on which laser beam is applied is brighter or darker than the color of a portion on which laser beam is not applied for each work, a code symbol acquiring process to generate or acquire the code symbol of the 2-dimensional code that consists of array patterns in which the dark and bright unit cells are arranged like a matrix taking the code color of the 2-dimensional code as a dark color and the background color as a bright color, and a laser marking process to execute laser marking by applying the laser beam to the area in which the bright color unit cells are arranged in the code symbol as well as by applying the laser beam to a margin area with a predetermined width that is set in the periphery of the code symbol under the condition that it has been judged that the generated color of the portion on which laser beam is applied is brighter than the color of the portion on which laser beam is not applied based on the generated color information.

By using this method, it can be judged whether the marking portion formed by application of laser beam has a bright mark or dark mark on the work W, and based on this judgment, in case that the material is the one that generates a bright mark on the marking portion, laser beam is applied to the background color (bright color) cell and is not applied to the code color (dark color) cell of the 2-dimensional code.

When doing this way, an area that is judged as bright cell in the code symbol of the non-reversed 2-dimensional code as an original image is marked to be bright and an area that is judged as code color cell is remained as dark. Thereby, even when the generated color of a portion on which laser beam is applied is brighter than the portion on which laser beam is not applied, non-reversed 2-dimensional code can be marked. Thus, since a bright/dark reversing function of reading device is not required and it is possible to use a conventional reading device, great cost reduction can be realized.

Further, in this method, in case that the material is the one that generates bright mark on marking portion, since laser beam is applied also on the margin area with a predetermined width that is set in periphery of 2-dimensional code, a quiet zone can be reserved. Thus, the area of 2-dimensional code is made clear and it becomes possible to read 2-dimensional code more accurately.

Furthermore, method for forming 2-dimensional code by laser marking relating to this invention comprises of a generated color information acquiring process to acquire the generated color information for judging whether a generated color of a portion on which laser beam is applied is brighter or darker than the color of a portion on which laser beam is not applied for each work, a reversed code symbol acquiring process to generate or acquire the reversed code symbol to which a margin area with a predetermined width consisting of an array of dark unit cells is attached to the periphery of array pattern in which the dark and bright unit cells are arranged like a matrix taking the code color of the 2-dimensional code as a bright color and the background color as a dark color under the condition that it has been judged that the generated color of the portion on which laser beam is applied is brighter than the color of the portion on which laser beam is not applied based on the generated color information, and a laser marking process to execute marking by applying the laser beam to the dark color unit cell among the unit cells constructing the reversed code symbol under the condition that the reversed code symbol is generated or acquired.

By using this method, it is possible to generate or acquire the reversed code symbol as a bright/dark reversed image of code symbol of 2-dimensional code as an original image. And, when it is judged that the marking portion becomes bright mark generated by applying the laser beam, marking data is generated based on this reversed code symbol.

When doing this way, even when the marking data is generated in such a simple method that generates the marking data so as to always apply laser beam on the dark color cell, it is possible to execute marking the non-reversed 2-dimensional code also for such a material that makes the color of a portion on which laser beam is applied brighter than the color of portion on which laser beam is not applied. Thus, since a bright/dark reversing function of reading device is not required and it is possible to use a conventional reading device that is possible to execute ordinary read out operation, great cost reduction can be realized.

Further, since laser beam is also applied on the margin area with a predetermined width set around the 2-dimensional code, a quiet zone is reserved. Thus, since the area of 2-dimensional code is made clear, it becomes possible to read the 2-dimensional code more accurately.

Furthermore, method for forming 2-dimensional code by laser marking relating to this invention comprises of a generated color information acquiring process to acquire the generated color information for judging whether a generated color of a portion on which laser beam is applied is brighter or darker than the color of a portion on which laser beam is not applied for each work, a code symbol acquiring process to generate or acquire the code symbol of the 2-dimensional code that consists of array patterns in which the dark and bright unit cells are arranged like a matrix taking the code color of the 2-dimensional code as a dark color and the background color as a bright color, a reversed code symbol generation process to generate a reversed code symbol by reversing the bright and dark portions of the code symbol as well as by attaching a margin area with a predetermined width consisting of an array of dark unit cells to its periphery under the condition that it has been judged that the generated color of the portion on which laser beam is applied is brighter than the color of the portion on which laser beam is not applied based on the acquired color information, and a laser marking process to execute marking by applying the laser beam to the dark color unit cell among the unit cells constructing the reversed code symbol under and subject to that the reversed code symbol is generated.

By using this method, it is possible to execute bright/dark reversing conversion based on the code symbol of 2-dimensional code as an original image as well as to generate the reversed code symbol by attaching the margin area with a predetermined width around it.

Further, when doing this way, even when the marking data is generated in such a simple method that generates the marking data so as to always apply laser beam on the dark color cell, it is possible to execute marking the non-reversed 2-dimensional code also for such a material that makes the color of a portion on which laser beam is applied brighter than the color of portion on which laser beam is not applied. Thus, since a bright/dark reversing function of reading device is not required and it is possible to use a conventional reading device that is possible to execute ordinary read out operation, great cost reduction can be realized.

Furthermore, since laser beam is also applied on the margin area with a predetermined width set around the 2-dimensional code, a quiet zone is reserved. Thus, since the area of 2-dimensional code is made clear, it becomes possible to read the 2-dimensional code more accurately.

Furthermore, the laser marking device relating to this invention comprises of a laser beam application means to apply laser beam to the work, and a control means that includes a recording unit that records the generated color information of each work for judging the generated color of a portion on which laser beam is applied, and a control unit having a judgment function for judging whether the generated color of a portion on which laser beam is applied is brighter or darker than the color of a portion on which laser beam is not applied based on the generated color information and a marking data generating function for generating a marking data for controlling the laser beam application means based on the information stored in the recording unit, and this control unit generates a marking data to apply the laser beam on the area in which the code color unit cells are arranged and on the margin area with a predetermined width set in periphery of the code symbol of the 2-dimensional code in which the code color and background color unit cells are arranged like a matrix under the condition that it has been judged that the generated color of the portion on which laser beam is applied is brighter than the color of the portion on which laser beam is not applied.

By using such a device described as above, even when generated color of a portion on which laser beam is applied may become either brighter or darker than the color of a portion on which laser beam is not applied, non-reversed 2-dimensional code is generated. Thus, since a bright/dark reversing function of reading device is not required and it is possible to use a conventional reading device that is possible to execute ordinary read out operation, great cost reduction can be realized.

Further, since a quiet zone is reserved around the 2-dimensional code, the area of the 2-dimensional code is made clear, and it becomes possible to read the 2-dimensional code more accurately.

At this time, it is desirable to construct the control unit so that it executes bright/dark reversing of the code symbol as well as it has a reversed code symbol generating function for generating a reversed code symbol by adding a dark color margin area with the predetermined width around the code symbol.

When doing this way, as described about claim 2, since it is possible to generate or acquire the reversed code symbol as a bright/dark reversed image of code symbol of the 2-dimensional code as an original image, even when the marking data is generated in such a simple method that generates the marking data so as to always apply laser beam on the dark color cell, it is possible to form always the non-reversed 2-dimensional code. Thus, since a bright/dark reversing function of reading device is not required and it is possible to use a conventional reading device that is possible to execute ordinary read out operation, great cost reduction can be realized. Further, since a quiet zone is reserved at the periphery of the 2-dimensional code, the area of the 2-dimensional code is made clear, and it becomes possible to read the 2-dimensional code more accurately.

At this time, it is desirable to construct the control unit so that it has a 2-dimensional code generating function.

By using this way, since it is possible to execute bright/dark reversing conversion based on the code symbol of the 2-dimensional code as an original image as well as to generate the reversed code symbol by attaching the margin area with the predetermined width around it, even when the marking data is generated in such a simple method that generates the marking data so as to always apply laser beam on the dark color cell, it is possible to generate always the non-reversed 2-dimensional code. Thus, since a bright/dark reversing function of reading device is not required and it is possible to use a conventional reading device that is possible to execute ordinary read out operation, great cost reduction can be realized. And, since a quiet zone is reserved around the 2-dimensional code, the area of the 2-dimensional code is made clear, and it becomes possible to read the 2-dimensional code more accurately.

Here, it is desirable to construct the control means so that it has a display unit that is possible to display the code symbol and the reversed code symbol. By doing this, operators can execute marking and preparation of the work while checking an image of the code symbol and the reversed code symbol.

The 2-dimensional code can be either a matrix type 2-dimensional code or a stack type 2-dimensional code.

The 2-dimensional code can also be formed by either a dot marking system in which the dots formed by laser beam application construct a unit cell by being arranged vertically and horizontally in n×n or n×m (n, m are integers), or a vector marking system in which a unit cell is formed by filling each area with vertical, horizontal and oblique lines.

BRIEF DESCRIPTION OF THE DRAWINGS

FIG. 8 is a diagram showing the marking pattern formed by color of a portion on which laser beam is applied;

FIG. 9 is a diagram showing the non-reversed 2-dimensional and the bright/dark reversed 2-dimensional code;

FIG. 10 and FIG. 11 are diagrams showing the modified cell for storing the embedded information (watermark information)

THE BEST MODE FOR CARRYING OUT THE INVENTION

One embodiment of the present invention is described below according to diagrams. Here, materials, arrangements, structures etc. do not restrict this invention and can be modified in various ways within a range covered by this invention.

Figure 1:
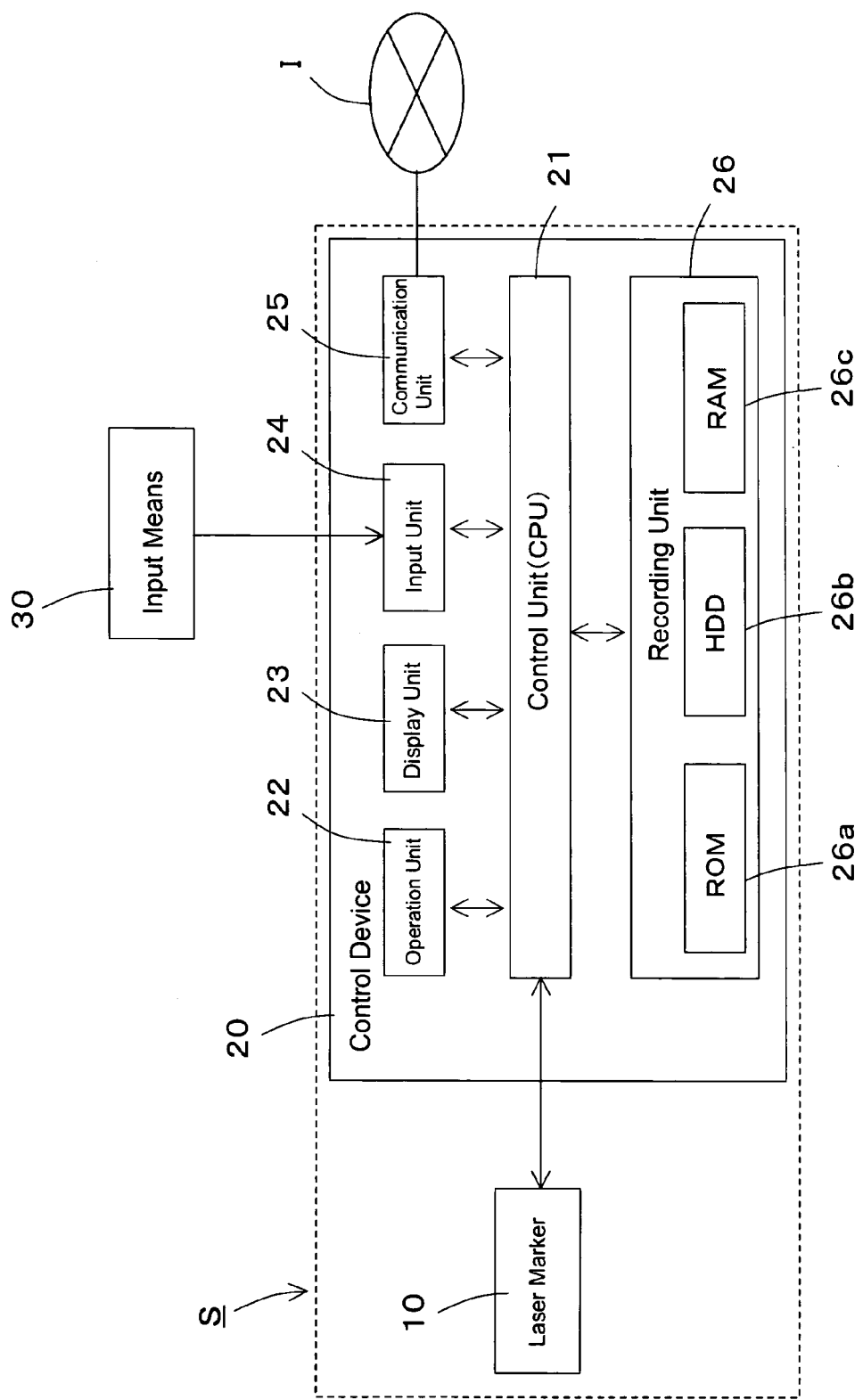
FIG. 1 is a schematic diagram of an overall structure of laser marking device according to an embodiment of the present invention.
Figure 2:
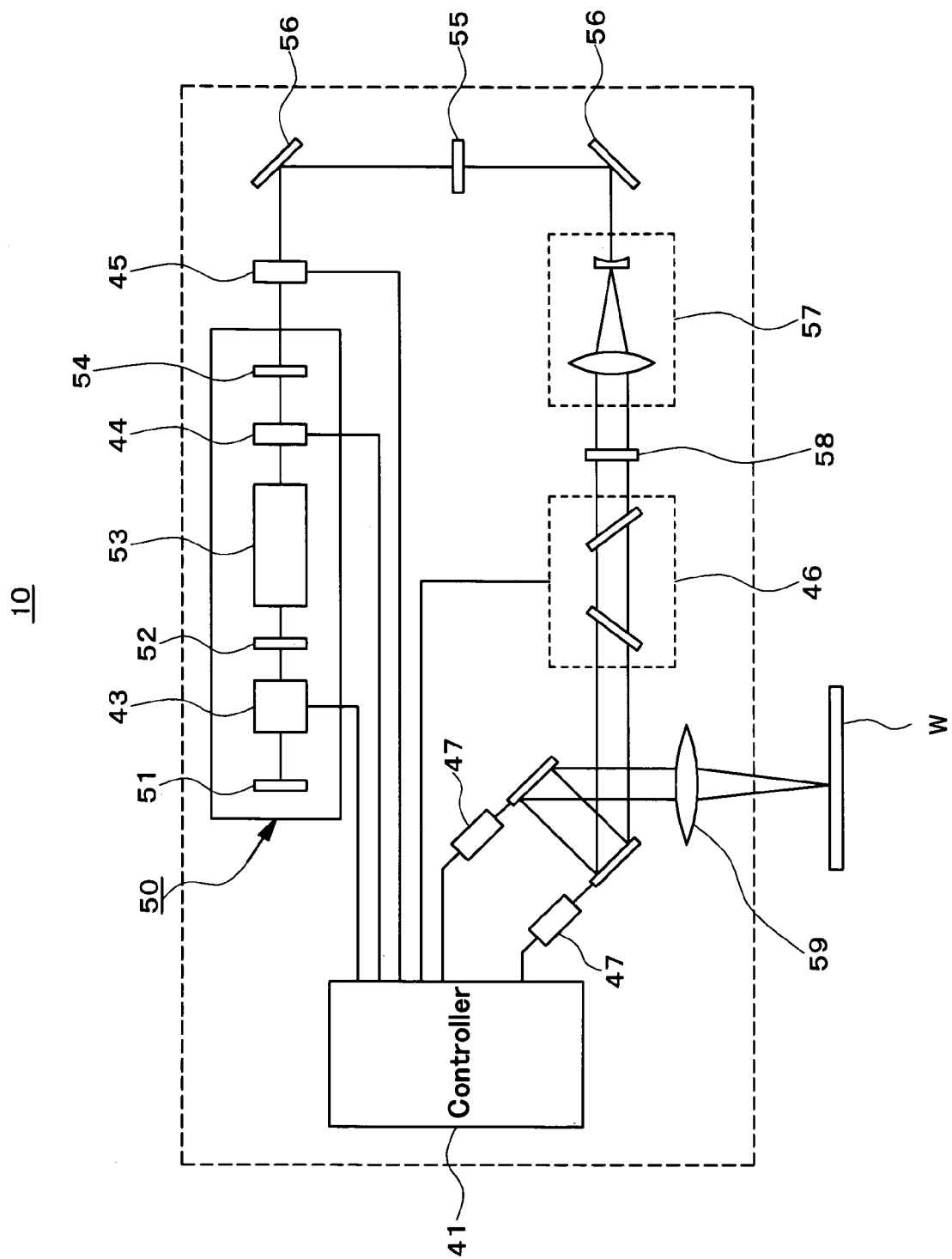
FIG. 2 is a schematic diagram of the laser marker according to an embodiment of the present invention.
Figure 3:
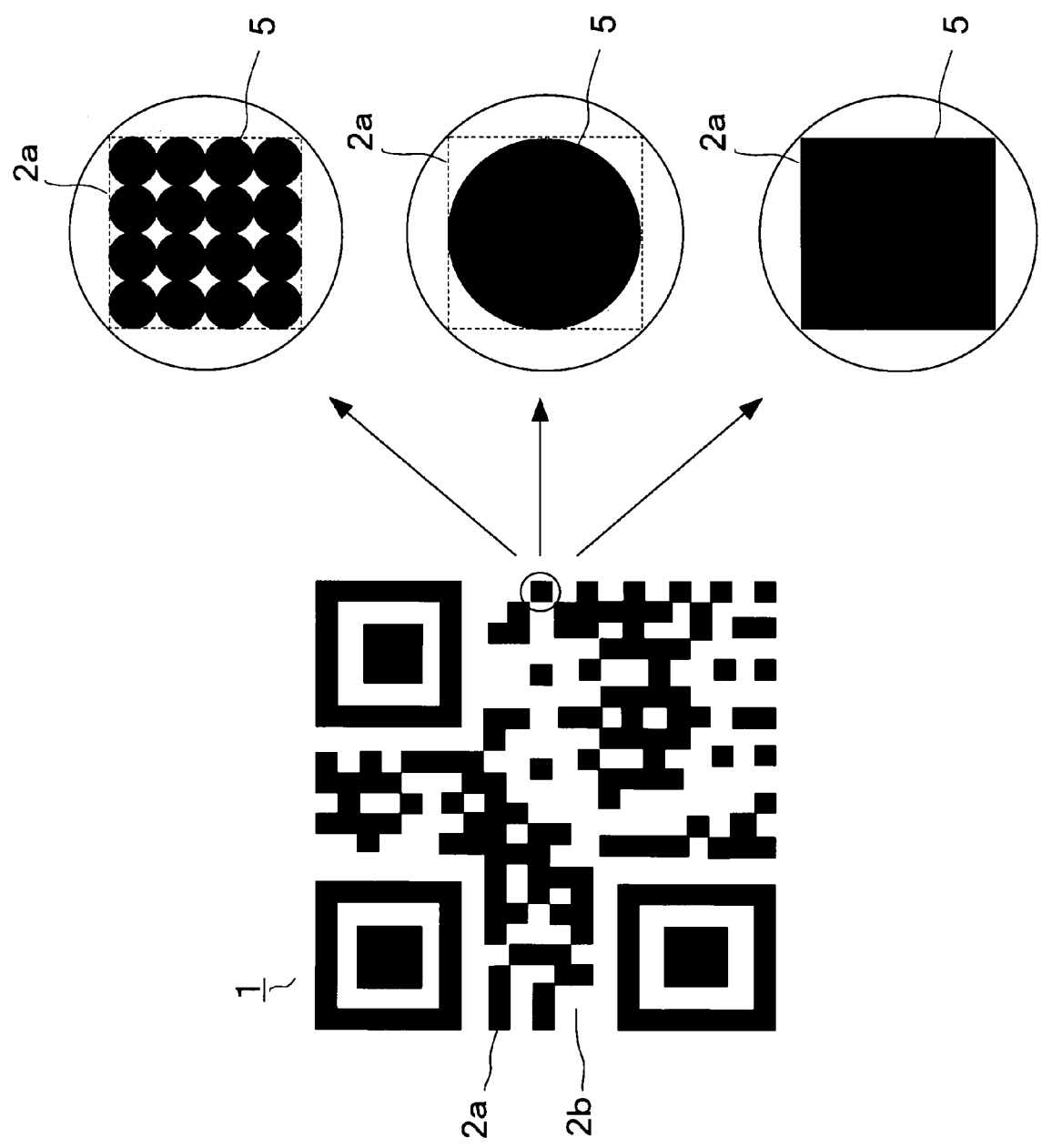
FIG. 3 is a diagram showing the dot marking system and the vector marking system for forming 2-dimensional code cells.
Figure 4:
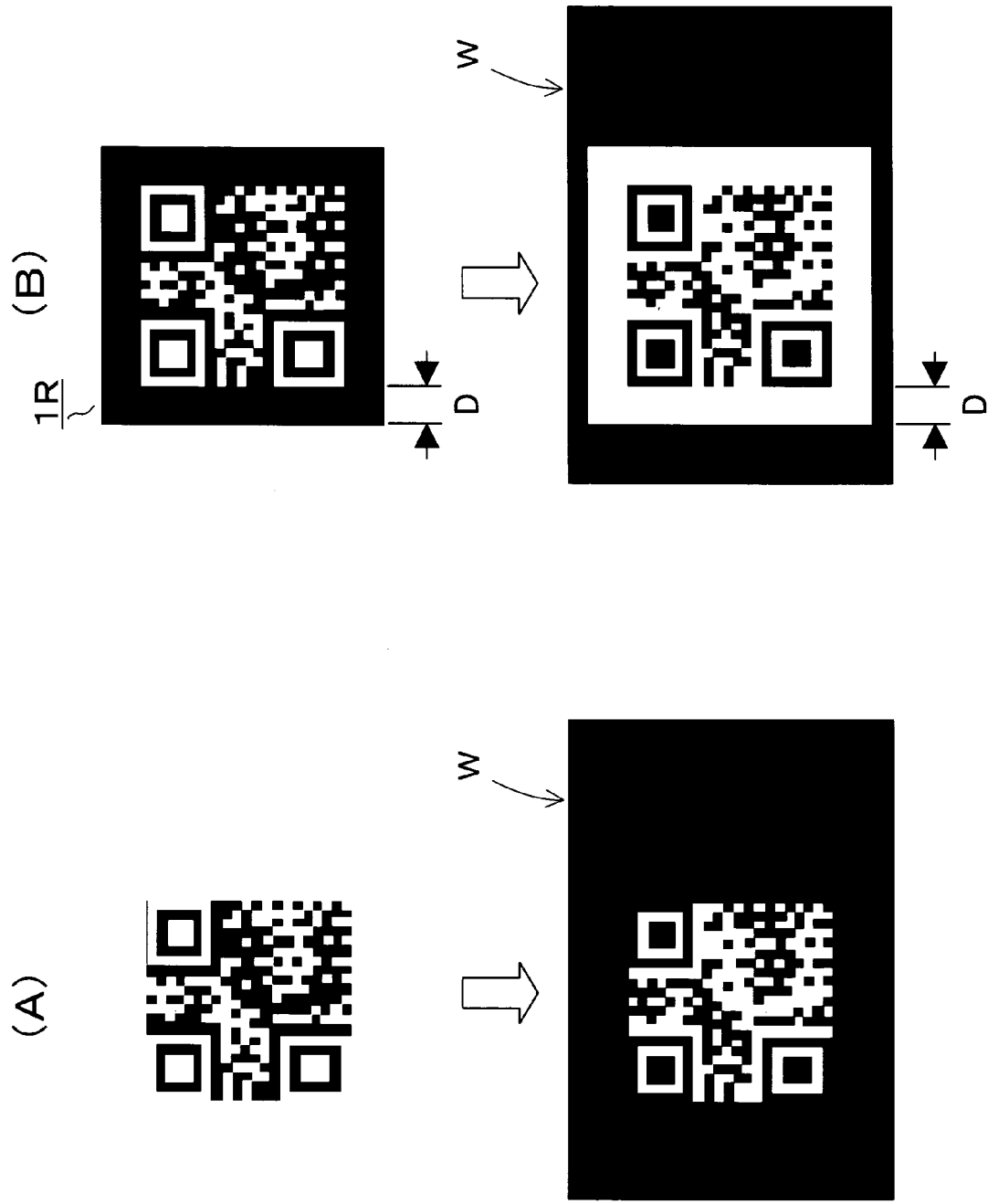
FIG. 4 is a diagram showing the reversed code symbol and the formed marking patterns based on the reversed code symbol according to an embodiment of the present invention.
Figure 5:
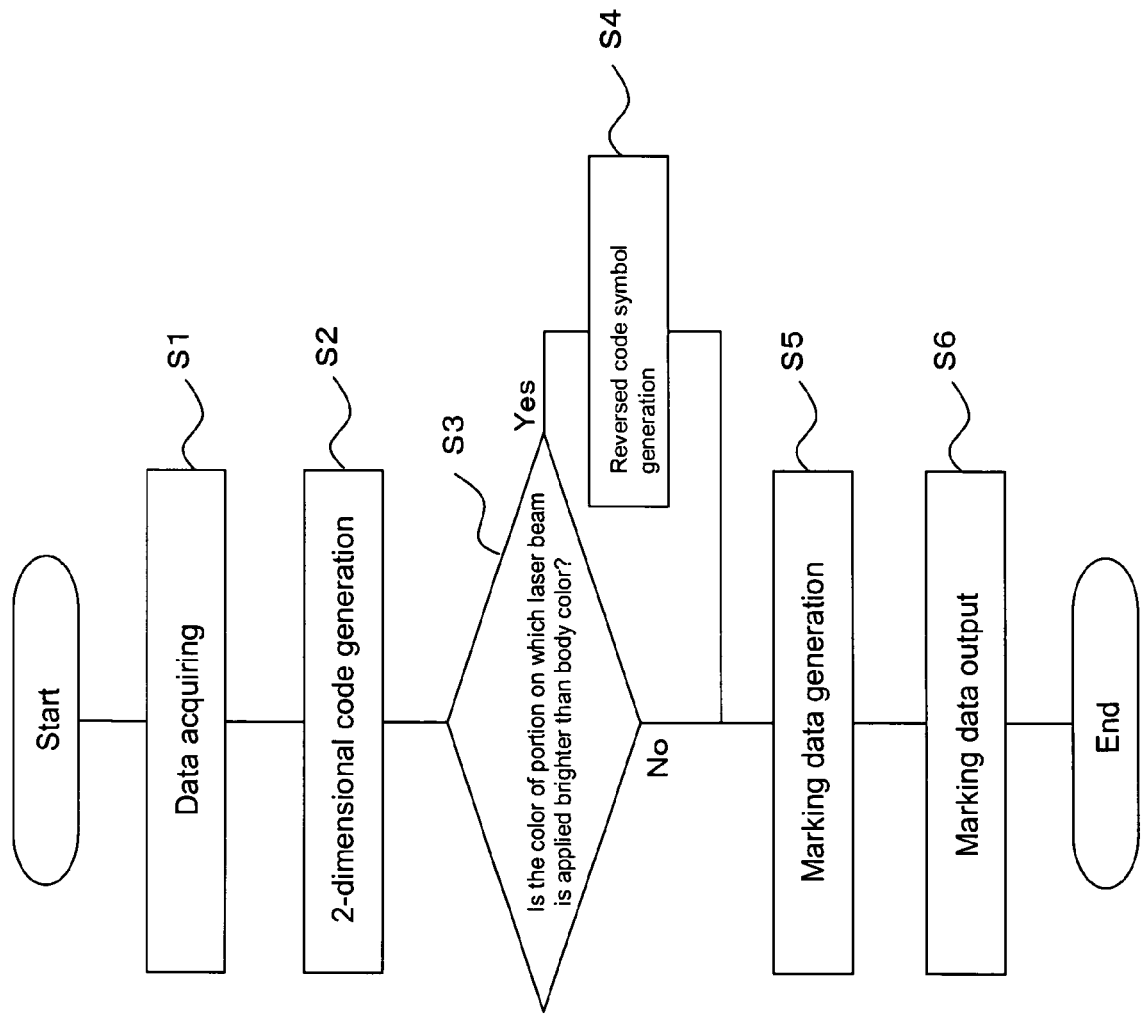
FIG. 5 is a flow diagram showing the flow for process of 2-dimensional code forming method according to an embodiment of the present invention.
Figure 6:
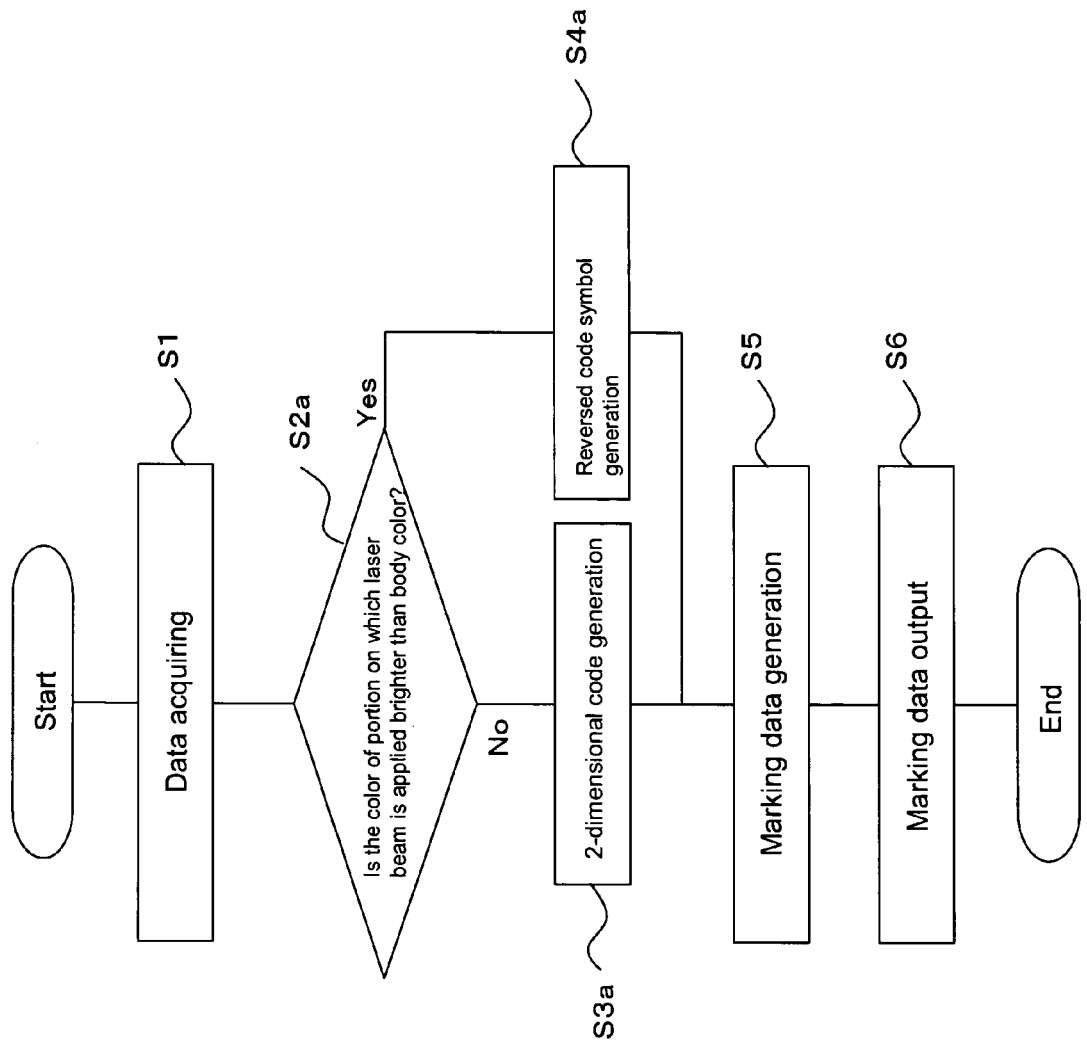
FIG. 6 and FIG. 7 are flow diagrams showing the flow for process of 2-dimensional code forming method by laser marking according to other embodiments of the present invention.
Figure 7:
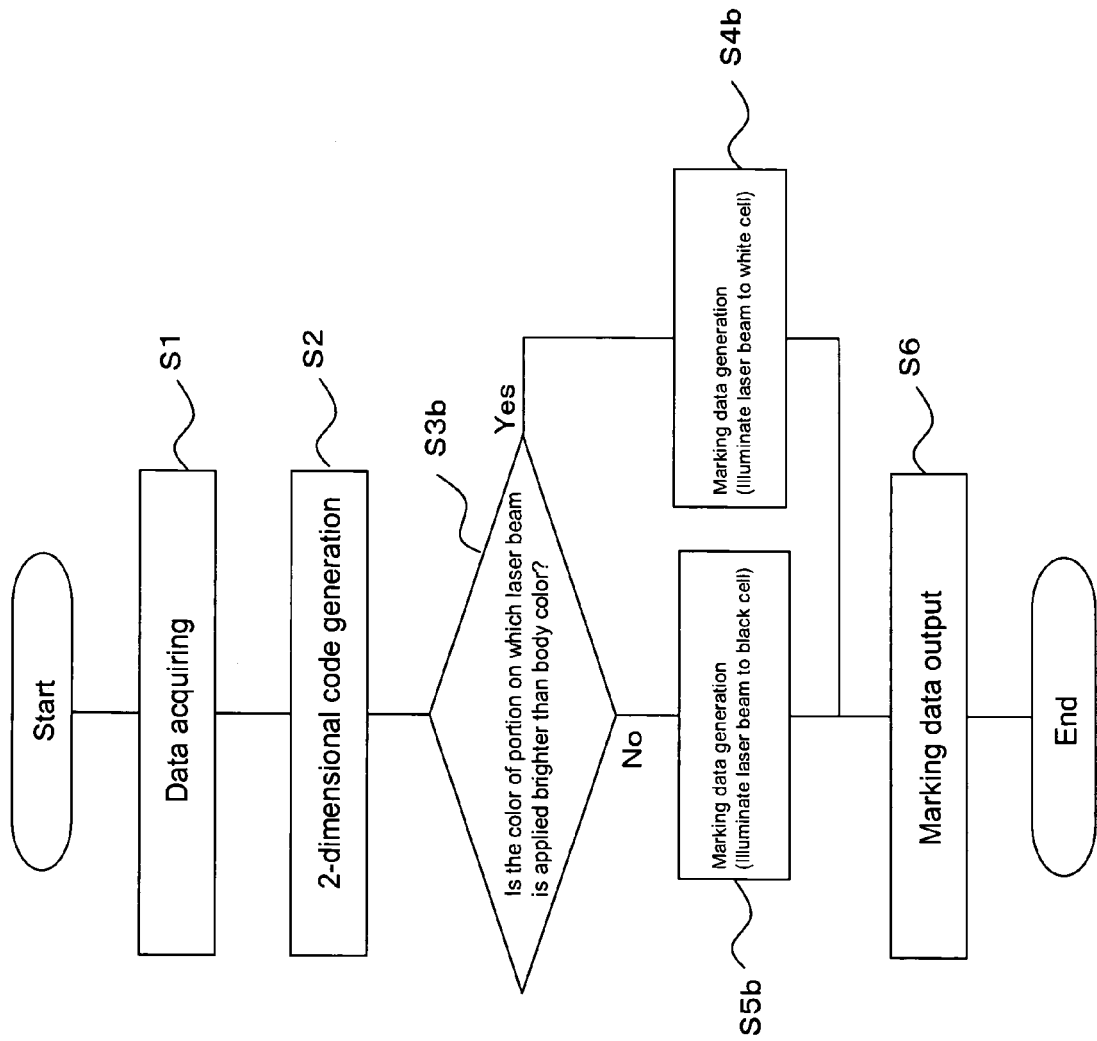

From FIG. 1 to FIG. 5 are diagrams showing one embodiment according to the present invention. FIG. 1 is a schematic diagram showing the overall structure of laser marking device; FIG. 2 is a schematic diagram showing the structure of laser marker; FIG. 3 is a diagram showing the dot marking system and the vector marking system for forming the 2-dimensional code cells; FIG. 4 is a diagram showing the reversed code symbol and the formed marking patterns based on the reversed code symbol; and FIG. 5 is a flow diagram showing the flow for process of 2-dimensional code forming method by laser marking according to this embodiment of the present invention. FIG. 6 and FIG. 7 are flow diagrams showing the flow for process of 2-dimensional code forming method according to other embodiments of laser marking.

(Overall Structure of Laser Marking Device)

FIG. 1 is a schematic diagram showing overall structure of laser marking device S according to an embodiment of the present invention.

This laser marking device S comprises of a laser marker 10 as a laser beam application means and a control device 20 as controlling means and is used adequately for marking patterns such as 2-dimensional code, characters, graphics, symbols and images on the work W (marked body).

This laser marker 10 corresponds to the laser beam application means of this invention and the control device 20 corresponds to the controlling means of this invention.

The control device 20 generates the 2-dimensional code based on the data that is input through various input means or communication networks, generates the marking data according to the 2-dimensional code and makes the laser marker 10 operate according to the generated marking data, and controls acquisition of data to be stored in 2-dimensional code, generation of 2-dimensional code and conversion the 2-dimensional code to marking data, and outputting of marking data.

The control device 20 comprises of an operation unit 22 consisting of keyboard and mouse, etc., a display unit 23 consisting of CRT and LCD monitor, etc., an input unit 24 consisting of interface boards for taking in image data and voice data, etc., a communication unit 25 consisting of modem etc., as an input/output interface with communication lines I, a recording unit 26 for recording control programs and various data, etc., and a CPU 21 as a control unit for controlling these units, etc.

The control device 20 according to an embodiment of this invention can be consisted of a personal computer, for example. Further, to the input unit 24, such an input means 30 as a scanner, a tablet, a CCD camera and a digital camera, etc. can be connected. It is also possible to connect an electronic recording media reading device to the input unit 24.

It is noted that this recording unit 26 corresponds to the recording unit of this invention and the CPU 21 corresponds to the control unit of this invention.

The control device 20 can take in the data to be stored in 2-dimensional code via the operation unit 22, the input unit 24 and the communication unit 25, and the acquired data are stored in the recording unit 26. The data stored in 2-dimensional code is taken in as the electronic data such as text data, image data and voice data, and may be any type that is possible to be converted into 2-dimensional code.

As described later, the control device 20 of this embodiment has 2-dimensional code generation program for generating the code symbol of 2-dimensional code, but when it doesn't have such a generation program, it is also possible to construct this control device so as to take in the code symbol of already generated 2-dimensional code via the communication unit 25. And it is also possible to construct the control device so as to output the acquired data to the outside and take in the 2-dimensional code that is generated by external conversion device based on this output data.

Further, the control device 20 is possible to take in the body color data of the surface of the work W (marked body) and the color that marking portion expresses, that is a generated color data, when the thumbprint such as dots is formed by laser beam applied on the surface of the work W to each work W via the operation unit 22, the input unit 24, and the communication unit 25.

The acquired data of body color and generated color on marking unit is stored in the recording unit 26 along with the data to be marked. CPU 21 is possible to judge whether the color that the marking portion expresses is brighter or darker than the body color based on the body color data and generated color data.

The body color data and the generated color data on marking unit are determined corresponding to the property of material that is forming the surface of the work W (marked body) and stored in the recording unit 26 along with the code symbol of generated 2-dimensional code to generate the marking data according to the data itself.

The body color data and the generated color data on marking unit are acquired at every time when laser marking is executed, and can be stored in the recording unit 26 as a correspondence table that parallelizes the material name of the work W or property of material with the generated color information in advance along with the parameter information that is described later.

By doing this, CPU 21 can read out the generated color information corresponding to the work W according to information of the material name and property of the work W from the recording unit 26, and is possible to judge whether the color of marking unit is brighter or darker than the body color.

When the data of generated color information corresponding to the input information is not recorded in the recording unit 26, it is also possible to construct the system so as to be possible to acquire the generated color information from external recording device such as servers via a communication lines I. And it is also possible to acquire the data via the recording media reading device that is connected to the input unit 24.

When the data corresponding to any recording unit is not found, it is also possible to construct the system so that to be possible to extract the similar one that is close to the material of this time's work W among the works W on which laser marking is executed in the past and to acquire the generated color information on this material with consideration of the material of work W.

Or, it is also possible to construct the system so that it executes a trial marking prior to final laser making. In this case, the result of trial marking is taken in via the operation unit 22, the input unit 24 or the communication unit 25 and is added to the corresponding table that is recorded in the recording unit 26, in the external recording device or in the electronic recording media, etc. By doing this way, every time when laser marking is executed for the first time on the material, available data for future use can be accumulated in turn.

It is noted that the body color data and the generated color data in this embodiment correspond to the generated color information of this invention and are the data required for processing to form the always non-reversed 2-dimensional code described later. And, besides this generated color information may be acquired as a form of body color data and generated color data, if the content of generated color information is the one that it is possible to judge whether the color of marking unit is brighter or darker than the body color, it can be any information. For example, it can be the judged data itself, or it can be a material name of the work W as above described. But, in this case, it is necessary that it has been made possible to read out the information from the correspondence table that parallelizes the material name with the judged result.

The recording unit 26 consists of ROM 26a for recording the control program to control the overall system, HDD 26b in which various data is recorded, and RAM 26c that is utilized as a work area to record the data temporarily.

In ROM 26a, such data as the acquired data, the display drive control program that controls the display unit 23 to display the acquired data from the recording unit 26, 2-dimensional code generation program for generating the code symbol 1 of the 2-dimensional code based on the acquired data, the reversing conversion control program for generating the reversed code symbol 1R by executing bright/dark reversing conversion on the code symbol of generated 2-dimensional code according to the generated color information of the work W, and the marking data generation program for generating the marking data that is output to the laser marker 10 by converting the generated code symbol 1 or the reversed code symbol 1R to the dot data or scan data, etc. are stored.

In HDD 26b and RAM 26c, the acquired or read out data, generated or converted code symbol, the marking data that is output to the laser marker 10, etc, are stored.

In HDD 26b, parameter information is recorded. The parameter information is the one that set marking conditions when executing laser marking corresponding to the property or feature size of the work W. As the marking conditions, there are laser frequency, output, number of printing times, beam diameter, and application time, etc. These conditions are set when executing laser marking and is read in by CPU 21.

The control device 20 functions so as to output the generated marking data to the laser marker 10 and execute laser marking of non-reversed 2-dimensional code on the work W. At this time, the control device 20 sends out the control signal containing the marking conditions along with the marking data. The control device 20 and the laser marker 10 can be constructed so as to be directly connected each other by a cable, or can be constructed so as to be connected via such information networks as a wireless LAN or Internet.

By constructing the system like this, it becomes possible to control the laser marker 10 by sending the commands and data from different or distant places. It becomes possible to construct the system in such ways, for example, that sets the control device 20 in the control room and sets the laser marker 10 in the working room, or that sets the control device 20 in the head office and sets the laser markers 10 in local factories.

The laser marker 10 can be a well known device, for example, using YAG laser, $CO_2$ laser, $YVO_4$ laser, UV laser, or Green laser, etc.

In this embodiment, although a structure that the control device 20 and the laser marker 10 are installed one to one, it is also possible to construct such a system in which plurality laser markers 10 are connected to one control device 20 and the laser marker 10 having an adequate laser beam can be selected corresponding to the marked material.

FIG. 2 is a diagram showing the structure of YAG laser device used in this embodiment as one example of laser markers 10. In the laser marker 10, the laser beam output from YAG laser oscillator 50 is changed its light path by leveling mirror 56 and after being focused by an aperture 55, and is expanded its beam diameter by Galileo type expander 57. In addition, this laser beam is adjusted the beam diameter by an aperture 58, after being attenuated by an attenuator 46, changed and adjusted its light path by a Galvano-mirror 47, focused by fθ lens 59 and finally applied on the work W as the marked body.

The YAG laser oscillator 50 is equipped with an ultra-sonic Q switch 43 to obtain a pulse laser beam having an extremely high peak output (peak value). The laser marker 10 according to this embodiment of the present invention is constructed so that one dot 5 is marked by a predetermined number of Q switched pulses.

The YAG laser oscillator 50 is further equipped with a full face mirror 51, an internal aperture 52, a lamp house 53, an internal shutter 44, and an output mirror 54, and at the output side of the YAG laser oscillator 50, an external shutter 45 is equipped. The controller 41 controls the Q-switch 43, the internal shutter 44, the external shutter 45, the attenuator 46, and the Galvano-mirror 47 based on the data and control signal transmitted from the control device 20.

(Structure of 2-Dimensional Code)

The 2-dimensional code according to this embodiment is the one that the dark color unit cells 2a and the bright color unit cells 2b are arranged in matrix state by dot marking system or vector marking system by laser marking method to form a code symbol 1 with a bright/dark mark.

As a type of 2-dimensional code, it is possible to use Data Matrix, Veri Code, QR Code, Aztec Code, Maxi Code, PDF417, and Micro PDF, etc. Among the above 2-dimensional codes, Data Matrix, Veri Code, QR Code, Aztec Code, and Maxi Code are the matrix type 2-dimensional code, and PDF417, and Micro PDF are the stack type 2-dimensional code, which have the shape of piling the conventional bar code. These can be read out using the reading device such as a laser scanner or a CCD scanner.

FIG. 3 is a diagram showing the QR Code as one example of 2-dimensional code.

Dot marking system is a method for forming the 2-dimensional code by applying laser beam to generate a dot 5 as an almost circular vestige of marking on the work W (marked body). To form a single cell, n×n or n×m (n, m is an integer) dots are arranged vertically and horizontally like a matrix forming a square or rectangular cell. For example, a cell 2a formed by 4×4 array of dot 5 is shown at the right-upper portion of FIG. 3, and a cell 2a formed by a single dot 5 in the right-middle potion of FIG. 3. The dot 5 having a diameter of some tens to some hundreds of microns are arranged separated by a distance between the center of each of dots 5 equal to the diameter in both vertically and horizontally.

In contrast, vector marking system is a method for forming a square or rectangular cells as shown in right-bottom portion of FIG. 3 by applying laser beam so as to make the dots overlap each other or by continuously applying laser beam having a width and scanning the point of application vertically or horizontally within the cell to fill the space in line from the top to the bottom.

Next, the technology to store embedded information (watermark information) into the 2-dimensional code according to this embodiment is described below.

It is possible to store various information in 2-dimensional code as a 2-dimensional array data having 1 bit per 1 cell by parallelizing the black cell 2a and the white cell 2b to 0 and 1, respectively, arranged in matrix state as shown in FIG. 3. The General information stored in 2-dimensional array data having 1 bit per 1 cell can be read out by applying ordinary decoding process to an image of 2-dimensional code.

On the other hand, in 2-dimensional code of this embodiment, embedded information (watermark information) is stored in addition to the above general information. As described above, the 2-dimensional code consists of white cell 2b and black cell 2a, while it is possible to embed information by making the imperfect shape cell 2a' contained into a part of black cell 2a.

FIG. 10(A) is a diagram showing a black cell 2a' contained in 2-dimensional code according to this embodiment. This black cell 2a' is formed by arranging the dots 5 in 10×10. But, in this case, since the dot 5 is not formed in all of the laser beam applied points of 10×10 dots in the standard area, it is formed as an imperfect form cell. This imperfect form cell 2a' is called here as "morph cell". In this morph cell 2a', dot 5 is not formed in the area corresponding to 2×6 dots at the right end side and 6×2 dots at the low end side. The morph cell is a cell formed as one or more dot 5 missed.

That is, 2-dimensional code 1 according to this embodiment consists of rectangular unit cells containing the white cell 2b and the black cell 2a, and the black cell 2a contains a morph cell 2a' that is different in shape from an ordinary rectangular unit cell.

Such morph cell 2a' with an imperfect shape is recognized by the reading device as shown in FIG. 10(B). If these dots are formed by dot marking system of laser marking method, since position accuracy of each dot 5 is very high, error amount in reading the morph cell 2a' contained in 2-dimensional code 1 is reduced.

This morph cell 2a' can be parallelized, for example, to a symbol having a 2-dimensional information of (0, 0).

Figure 11:
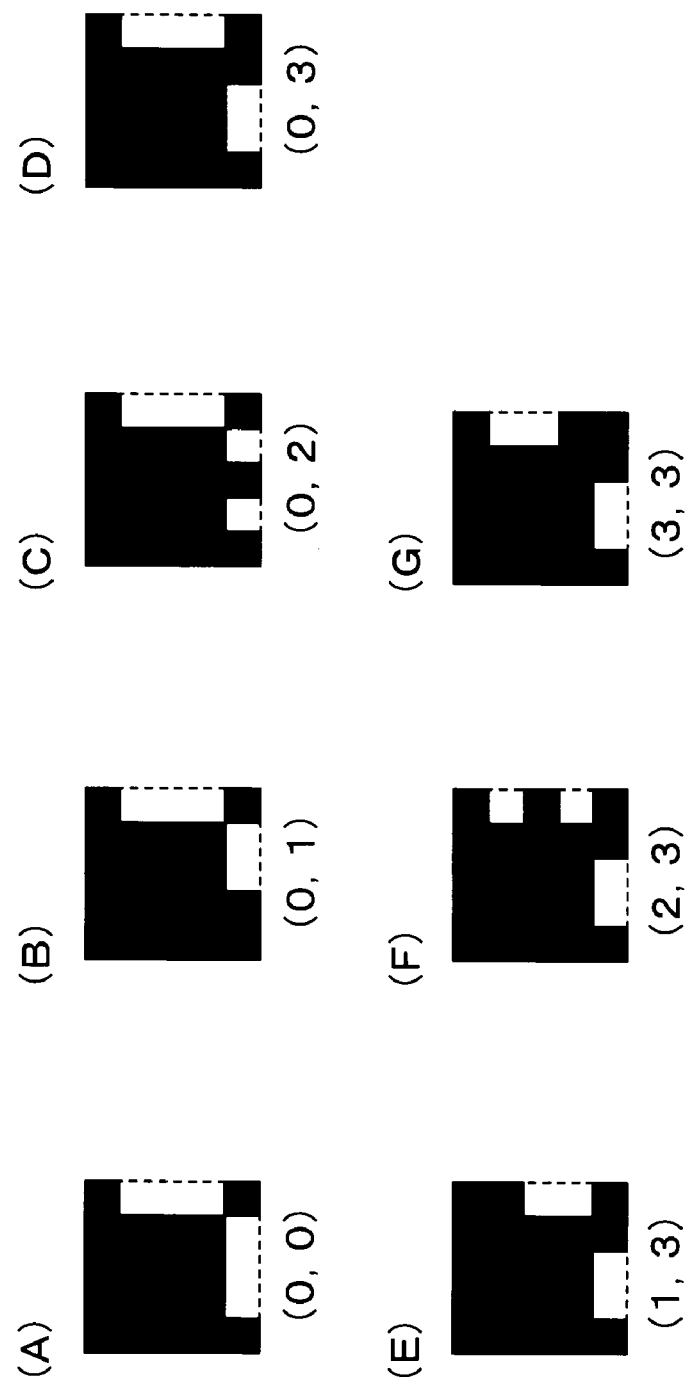

FIG. 11 is a diagram showing the morph cell 2a' parallelized to a symbol having a 2-dimensional information similar to FIG. 10. FIG. 11(A) is the same as FIG. 10.

In FIG. 11(A)~(D), depending on the state of missing of the dot 5 at the low end side, these morph cells are parallelized to four types of symbol (X, 0), (X, 1), (X, 2) and (X, 3), respectively (and X=0~3). And, in FIG. 11(D)~(G), depending on the state of missing of the dot 5 at the right end side, these morph cells are parallelized to four types of symbol (0,Y), (1, Y), (2,Y) and (3,Y), respectively (and Y=0~3). Thus, depending on combination of missing status of the dot 5 at the right and low end side, it is possible to express 16 (=4×4) symbols.

In this way, it is possible to express characters such as numeric and alphabet by a combination of one or more morph cells 2a'. For example, it is possible to express 256 (=16×16) symbols using two morph cells 2a', thereby, to parallelize these symbols to numeric and alphabet, etc. Moreover, it is possible to parallelize more symbols to this 2-dimensional code by adding more missing status also to the top and left end sides of the morph cell.

A correspondence table that parallelized such morph cells 2a' to symbols is recorded in the recording unit 26.

In this way, since it is possible to store the general information and the embedded information (watermark information) in 2-dimensional code, it is also possible to embed a 2-dimensional code to a product and embed such information as a year/month/date of manufacturing or a lot number into the 2-dimensional code, and further to store such information that indicates the article is a genuine product (for example, a product number) as an embedded information (watermark information).

That is, the embedded information is expressed by a combination array of the above morph cells 2a', then this combination arrays of the above morph cells 2a' are arranged with an adequate separation and are laser marked in 2-dimensional code. For example, it is possible to arrange the morph cells 2a' in turn to positions on which the black cell 2a should be marked starting from the top to the bottom of the 2-dimensional code. In addition to this way, it is also possible to arrange the 2-dimensional code so that the black cells 2a may be included so as not to arrange continuously the morph cells 2a', that is, arrangement is optional.

In this way, it is possible to obtain a combination array of the morph cells 2a' by selecting only the morph cell 2a' when reading and by re-arranging it, and it is possible to decode the embedded information by using this combination array.

In decoding process of embedded information, it is judged whether the cell is a morph cell 2a' or not in turn against the cells contained in 2-dimensional code. When it is judged that the cell is a morph cell 2a' based on the correspondence table expressing the correspondence between the shape of the morph cell 2a' and symbols or characters, a symbol or character corresponding to the shape of relevant morph cell 2a' is selected.

It is also possible to include other information than the one indicating that the article is a genuine product as the embedded information.

This technology is the one that is possible to increase practically the amount of data to be stored in the 2-dimensional code. Here, a method for storing the embedded information (watermark information) is not limited to the method in which a part of the black cell 2a is taken as the morph cell 2a', and it can be modified in various way.

Figure 12:
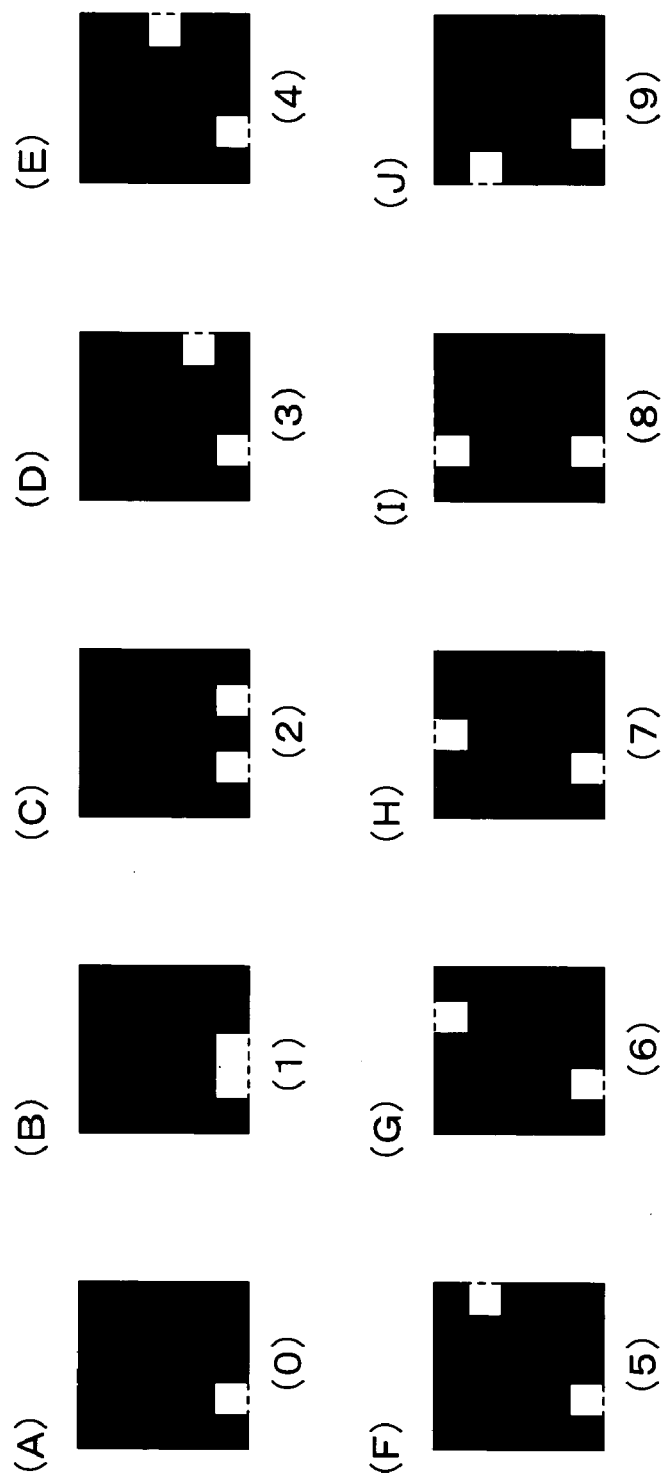
FIG. 12 and FIG. 13 are diagrams showing other examples of modified cell.

FIG. 12 is a diagram showing a different example of the morph cell 2a' from FIG. 11. FIG. 12(A)~(J) are showing the shape of morph cell parallelized to ten symbols of "0" to "9", for example. In this example, a shape that has one white (missing) portion at the bottom and left side of the cell is paralleled to "0". And taking a white portion at the bottom and left side as a reference, shapes having various combinations of white (missing) portions are parallelized to symbols of "1" to "9". From "1" to "9", another white portion moves counterclockwise in the cell.

Figure 13:
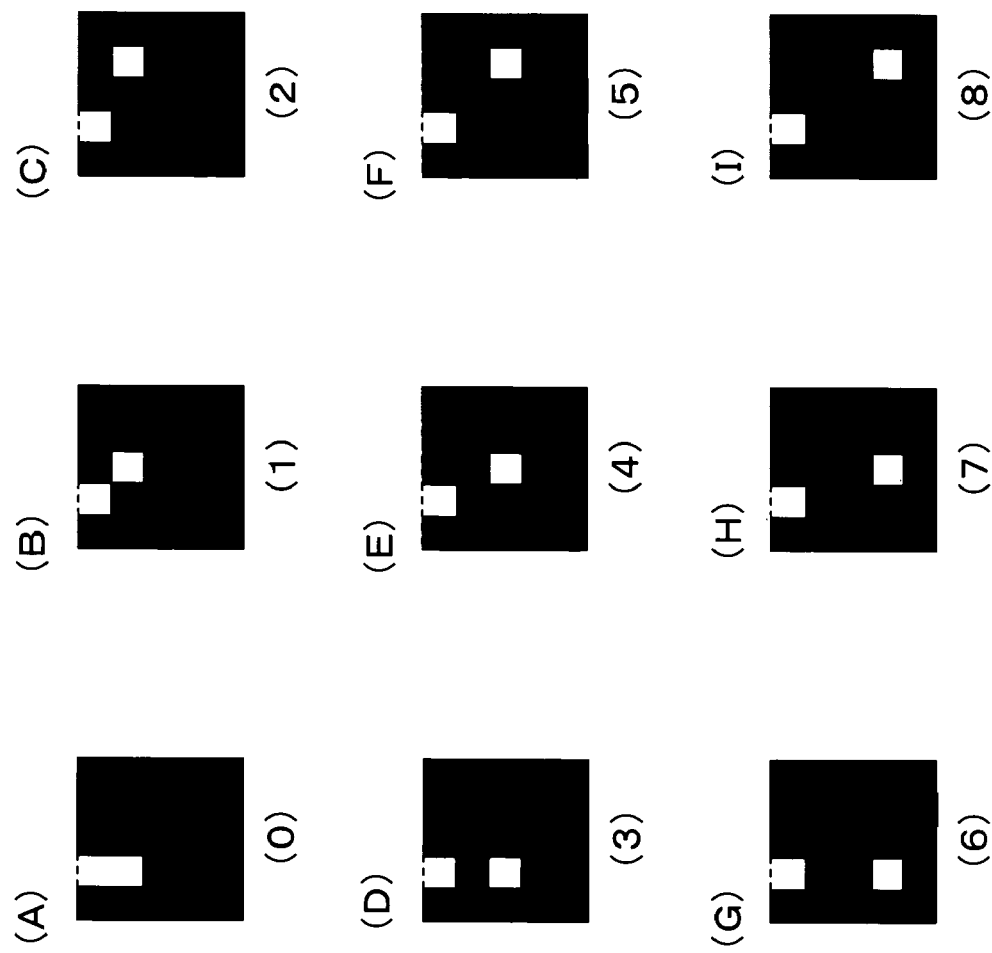

FIG. 13 is a diagram showing a different example of the morph cell 2a' from FIG. 11 and FIG. 12. FIG. 13(A)~(I) are showing the shape of morph cell parallelized to nine symbols of "0" to "8", for example. In this example, taking a white portion at the top and left side as a reference, shapes are parallelized to nine symbols by a combination of this portion and another internal white portion.

(A Method for Forming Always Non-Reversed 2-Dimensional Codes)

Next, a method for forming always non-reversed 2-dimensional codes by laser marking is described below.

As described in the section of "conventional art", when executing laser marking against the material that generates bright mark in marking unit by laser marking in the same way as the ordinary material, bright/dark reversed image of original image is generated. Including such a material, in order to form always non-reversed 2-dimensional code in any types of material, it is necessary to judge whether the marking unit formed on the surface of material becomes bright mark or dark mark, and according to this judgment, in case the material on which the marking unit becomes a bright mark, to control the laser marker 10 so as to illuminate laser beam to the background color cell but not to the code color cell, and on the other hand, in case the material on which the marking unit becomes a dark mark, to control the laser marker 10 so as to illuminate laser beam to the code color cell but not to the background color cell.

Thus, in this embodiment, bright/dark reversing conversion of code symbol 1 of original image is executed under the condition that the material of the work W is the one that generates bright mark on the marking unit based on the generated color information obtained. Then, when bright/dark reversing conversion is executed, marking data is generated according to the code symbol of the bright/dark reversed image, and when bright/dark reversing conversion is not executed, marking data is generated based on the code symbol 1 of the original image.

At this time, even when using the code symbol of either the original image or the bright/dark reversed image, a marking data is generated so that laser beam is applied on the dark color cell area of code symbol. That is, a marking data for controlling the laser marker 10 so as to form the dots on dark color cell area, or so as to scan and fill the cell vertically and horizontally while applying the laser beam continuously is generated.

By doing this way, marking is executed so that the code color portion of the code symbol 1 of original image becomes dark and the background color portion becomes bright resulting in formation of non-reversed 2-dimensional code.

However, if laser marking is executed by generating the marking data from a pattern that is simply bright/dark reversed from original image, as shown in FIG. 4A, since the body color of the work W spreading around the marking pattern is the same as the color of code portion in the marking pattern, no space margin (quiet zone) is formed around the marking pattern. Generally, as shown by dotted line in FIG. 9A, it is said that a quiet zone having a predetermined width D should be reserved around the code symbol of the 2-dimensional code. In contrast, when a quiet zone is not reserved as shown in FIG. 4A, such a problem that outer edge of 2-dimensional code area becomes unclear and reading of 2-dimensional code becomes impossible is generated.

Thus, in this embodiment, a pattern that is added a dark margin having the predetermined width D corresponding to the quiet zone is generated around the bright/dark reversed from original image as a reversed code symbol 1R. That is, the figure as shown in the upper portion of FIG. 4B is the reversed code symbol 1R. This predetermined width D is specified to be less than some cm. By doing this, since the periphery of code symbol is marked with bright color by predetermined width, as shown in the lower portion of FIG. 4B, the quiet zone is reserved around the code symbol and the non-reversed marking pattern is formed. By doing this, it is possible to make the reading device recognize clearly the boundary of the 2-dimensional code area. So it becomes possible to reliably read out the 2-dimensional code.

This code symbol 1 corresponds to the codes symbol of this invention and the reversed code symbol 1R corresponds to the reversed code symbol of this invention.

Here, in this embodiment, the material of the work W (marked body) may be any types if a portion of it on which laser beam is applied generates a different color from body color. As a such material that a portion on which laser beam is applied generates a brighter color than the body color, there are a transparent material such as glass, a metal such as Al, resin, cloth, ceramic, silicon, etc. Any body of which surface is covered with a thin film consisted of above materials is also available. For example, a water proofed material used for clothing or tent, etc. of which surface is covered by composite-layer consisting of PolyTetraFluoroEthylene porous film and PolyPropylene fine porous film is available.

(Method for Forming 2-Dimensional Code by Laser Marking)

FIG. 5 is a diagram showing the process flow controlled by the control unit 20 in method for forming a 2-dimensional code by laser marking in this embodiment. The process flow is explained below according to this flow chart.

First, besides obtaining the data to be stored in the 2-dimensional code, information of generated color of the work W is obtained (Step S1). At this time, data is obtained by acquiring via the input 30 means such as scanners and tablets, or external computer and electronic recording media, etc, or by reading out the data stored in advance in the recording unit 26 in control device 20. The acquired data is displayed on the display unit 23. In this data acquisition process, the process to execute acquiring of generated color information corresponds to the color information acquiring process in this invention.

Next, CPU 21 executes data conversion process acquired in Step S1 based on 2-dimensional code generation program stored in ROM 26a and generates the 2-dimensional code having desired form and size (Step S2). Here, the generated code symbol 1 of 2-dimensional code is displayed on the display unit 23. Thus, the process to execute data acquiring process to be stored in the 2-dimensional code and to generate the 2-dimensional code corresponds to the code symbol acquiring process in the present invention.

When acquiring the code symbol of 2-dimensional code that has already been generated in data acquiring process, 2-dimensional code generating process is skipped. In this case, the process to acquire the code symbol of the 2-dimensional code corresponds to the code symbol acquiring process.

Then, CPU 21 judges whether the color of the marking unit is brighter or darker than the body color of the work W according to generated color information acquired (Step S3).

When the color of the marking unit is judged to be brighter than the body color (Step S3: Yes), CPU 21 generates the reversed code symbol based on the reversing control program stored in ROM 26a (Step S4). This process that executes judgment of generated color information and generation of reversed code symbol corresponds to the reversed code symbol generation process according to the present invention.

In this reversed code symbol generation process, bright/dark reversing conversion against the code symbol 1 generated in Step S2 is executed and a pattern to which a dark color (code color) quiet zone having the predetermined width is generated around the bright/dark reversed pattern. This pattern is taken as the reversed code symbol 1R and displayed on the display unit 23. Then, marking data generation process is executed (Step S5).

On the other hand, when the color of the marking unit is judged to be darker than the body color in Step S3 (Step S3: No), marking data generation process is executed (Step S5).

In marking data generation process, in Step S4, the marking data that the reversed code symbol 1R is generated or the code symbol 1 of 2-dimensional code generated in Step S2 when the reversed code symbol 1R is not generated, respectively, is converted to dot data or scan data based on the marking data generation program and output to the laser marker 10 is generated. At this time, the marking data is generated so that laser beam is applied and the dots are formed or scanned to dark color cell area among the bright and dark cell array when using any of the reversed code symbol 1R and the code symbol 1.

This process that executes marking data processing corresponds to the marking data generation process in the present invention.

Next, in the marking data output process (Step S6), CPU 21 executes outputting process of control signal containing the marking data and the parameter information to laser marker 10. The laser marker 10 applies laser beam based on this output data to execute laser marking of 2-dimensional code on the work W.

The marking data generation process, the marking data output process and the laser beam application process correspond to the laser marking process in the present invention.

The Second Embodiment

Method for Forming 2-Dimensional Code by Laser Marking

In the first embodiment, the reversed code symbol 1R is generated by executing bright/dark reversing conversion and by attaching the quiet zone to its periphery under the condition that the code symbol 1 of the 2-dimensional code generated or acquired first is judged that the color of marking portion is brighter than the body color as the result of judgment based on generated color information.

In the second embodiment, judgment is executed first based on generated color information without generating the code symbol of non-reversed 2-dimensional code. When the color of marking portion is judged to be brighter than the body color as the result, the pattern of reversed code symbol 1R is directly generated without executing bright/dark reversing conversion. And, when the color of marking unit is judged to be darker than the body color as the result, the process to generate the code symbol 1 of non-reversed 2-dimensional code is executed.

In FIG. 6, in case the operation is the same as the first embodiment, its explanation is skipped and only the different operations from the first embodiment are explained using the same symbols as those used in the same steps. In the first and the second embodiments, Step S1, Step S5 to Step S6 are executed by the same sequence.

After executing data acquiring process (Step S1), judgment whether the color of the marking unit of the work W is brighter or darker than the body color of the work W is executed according to generated color information acquired (Step S2a). When the color of marking portion is judged to be brighter than the body color (Step S2a: Yes), reversed code symbol generation process is executed (Step S4a). This process that executes judgment of generated color information and generation of reversed code symbol corresponds to the reversed code symbol generation process according to the present invention.

In this reversed code symbol generation process, data conversion process of data acquired in Step 1 is executed based on the 2-dimensional code generation program and the reversing conversion control program stored in ROM 26a and the reversed code symbol 1R having a desired form and size is generated (Step S4a). Then, the marking data generation process is executed (Step S5).

Here, in this reversed code symbol acquiring process, it is also possible to acquire the reversed code symbol that has been already generated via the input unit 24, etc. based on the acquired generated color information.

On the other hand, when the color of marking portion is judged to be darker than the body color (Step S2a: No), non-reversed code symbol generation process is executed (Step S3a) and marking data generation process (Step S5) is executed.

The Third Embodiment

Method for Forming 2-Dimensional Code by Laser Marking

In the first and the second embodiment, first, judgment based on the generated color information is executed. And when the color of marking unit is judged to be brighter than the body color as the result, reversed code symbol 1R is generated and the marking data is generated based on this reversed code symbol 1R. At this time, the marking data is generated so that the laser beam may be applied to the dark cell area and the dots may be formed or scanned among the bright and dark cell array.

In the third embodiment, reversed code symbol 1R is not generated. That is, first, the 2-dimensional code is generated or acquired based on the acquired data. Then, judgment based on the generated color information is executed. And, when the color of marking portion is judged to be brighter than the body color as the result, the pattern to which a bright color quiet zone is added around the non-reversed code symbol is generated under the condition that there is that judgment, and at the same time, the marking data is generated so that the laser beam may be applied to the bright cell area and the dots may be formed or scanned, not to the dark cell area in the bright and dark cell array.

In FIG. 7, in case the operation is the same as the first embodiment, its explanation is skipped and only the different operations from the first embodiment are explained using the same symbols as those used in the same steps. In the first and the third embodiments, Step S1, Step S2 and Step S6 are executed by the same sequence, and Step S5b is executed by the same sequence as Step S5 in the first embodiment.

After executing the data acquiring process (Step S1), 2-dimensional code having a desired form and size is generated (Step S2). Or, it is also possible to acquire the 2-dimensional code from the outside.

Next, based on the acquired generated color information, judgment whether the color of marking portion of the work W is brighter or darker than body color of the work W (Step S3b).

Then the marking data generation process is executed.

In converting the code symbol 1 of 2-dimensional code to dot data or scan data, when the color of marking portion is judged to be brighter than body color (Step S3b: Yes), the pattern to which a bright color quiet zone is attached around the code symbol 1 is generated, and the marking data is generated so that the laser beam may be applied to the bright cell area of this pattern and the dots may be formed or scanned (Step S4b).

On the other hand, when the color of marking portion is judged to be darker than body color (Step S3b: No), the marking data is generated so that the laser beam may be applied to the dark cell area of the code symbol 1 of 2-dimensional code that is generated or acquired (Step S5b).

In this way, non-reversed 2-dimensional code is always generated and the area of 2-dimensional code is made clear without executing bright/dark reversing conversion process.

What is claimed is:

1. Method for forming a 2-dimensional code by laser marking to execute laser marking the 2-dimensional code on a work comprising:
 a generated color acquiring process for acquiring the generated color information for judging whether the color of a portion on which laser beam is applied is brighter or darker than the color of portion on which laser beam is not applied for each the work,
 a code symbol acquiring process for generating or acquiring the code symbol of the 2-dimensional code consisting of array pattern that the dark and bright color unit cells are arranged in matrix state taking the code color and the background color of the 2-dimensional code as a dark color and a bright color, respectively, and
 a laser marking process for executing laser marking by applying the laser beam on the area in which the bright color unit cells are arranged in the code symbol as well as by applying the laser beam on a margin area having a predetermined width that is attached to the periphery of the code symbol under the condition that the color of the portion on which the laser beam is applied is judged to be brighter than the color of the portion on which the laser beam is not applied based on the generated color information.

2. Method for forming a 2-dimensional code by laser marking to execute laser marking the 2-dimensional code on a work comprising:
 a generated color acquiring process for acquiring the generated color information for judging whether the color of a portion on which laser beam is applied is brighter or darker than the color of portion on which laser beam is not applied for each the work,
 a reversed code symbol acquiring process for generating or acquiring the reversed code symbol that a margin area having a predetermined width consisting of the arrangement of the dark color unit cells is attached to the periphery of the array pattern that the dark color and the bright color unit cells are arranged in matrix state taking the code color of the 2-dimensional code and the background color as a bright color and a dark color, respectively, under the condition that the color of the portion on which the laser beam is applied is judged to be brighter than the color of the portion on which the laser beam is not applied based on the generated color information, and
 a laser marking process for executing laser marking by applying the laser beam on the dark color unit cell out of the unit cells constructing the reversed code symbol under the condition that the reversed code symbol is generated or acquired.

3. Method for forming a 2-dimensional code by laser marking to execute laser marking the 2-dimensional code on a work comprising:
 a generated color acquiring process for acquiring the generated color information for judging whether the color of a portion on which laser beam is applied is brighter or darker than the color of portion on which laser beam is not applied for each the work,
 a code symbol acquiring process for generating or acquiring the code symbol of the 2-dimensional code consisting of array pattern that the dark and bright color unit cells are arranged in matrix state taking the code color of the 2-dimensional code and the background color of the 2-dimensional code as a dark color and a bright color, respectively,
 a reversed code symbol generation process for generating the reversed code symbol by executing bright/dark reversing of the code symbol, and at the same time, by attaching the margin area having a predetermined width consisting of the dark color unit cell array to the periphery of the code symbol, under the condition that the color of the portion on which the laser beam is applied is judged to be brighter than the color of the portion on which the laser beam is not applied, and
 a laser marking process for executing laser marking by applying the laser beam on the dark color unit cell out of the unit cells constructing the reversed code symbol under the condition that the reversed code symbol is generated or acquired.

4. Method for forming a 2-dimensional code by laser marking according to claim 1 in which the 2-dimensional code consists of either a matrix type 2-dimensional code or a stack type 2-dimensional code.

5. Method for forming a 2-dimensional code by laser marking according to claim 1 in which the 2-dimensional code is formed by either a dot marking system in which the dots generated by laser beam application construct a unit cell by being arranged vertically and horizontally in n×n or n×m (n, m are integers), or a vector marking system in which a unit cell is formed by filling each area with vertical, horizontal and oblique lines.

6. A laser marking device comprising:
 a laser beam application means for applying the laser beam on the work and
 a control means that includes a recording unit to store the generated color information for judging the generated color of a portion on which laser beam is applied for each the work and a control unit that has a judging function to judge whether the color of the portion on which laser beam is applied is brighter or darker than the color of portion on which laser beam is not applied for each work based on the generated color information and a marking data generating function to generate the marking data for controlling the laser beam application means based on the information stored in the recording unit, and
 the control unit generates the marking data for applying the laser beam on the area in which background color unit cells are arranged in the code symbol of 2-dimensional code in which code color and the background color unit cells are arranged in matrix state and the margin area having a predetermined width attached to the periphery of the code symbol under the condition that the color of the portion on which the laser beam is applied is judged to be brighter than the color of the portion on which the laser beam is not applied.

7. A laser marking device according to claim 6, in which the control unit has a reversed code symbol generation function that executes bright/dark reversing of the code symbol, and at the same time, attaches the dark color margin area having a predetermined width to generate the reversed code symbol.

8. A laser marking device according to claim 6 in which the control unit has 2-dimensional code generation function.

9. A laser marking device according to claim 6 in which the control means has a display unit that is possible to display the code symbol and the reversed code symbol.

10. A laser marking device according to claim 6 in which the 2-dimensional code consists of a matrix type 2-dimensional code or a stack type 2-dimensional code.

11. A laser marking device according to claim 6 in which the 2-dimensional code is formed by either a dot marking system in which the dots formed by laser beam application construct a unit cell by being arranged vertically and horizontally in n×n or n×m (n, m are integers), or a vector marking system in which a unit cell is formed by filling each area with vertical, horizontal and oblique lines.

12. Method for forming a 2-dimensional code by laser marking according to claim 2 in which the 2-dimensional code consists of either a matrix type 2-dimensional code or a stack type 2-dimensional code.

13. Method for forming a 2-dimensional code by laser marking according to claim 3 in which the 2-dimensional code consists of either a matrix type 2-dimensional code or a stack type 2-dimensional code.

14. Method for forming a 2-dimensional code by laser marking according to claim 2 in which the 2-dimensional code is formed by either a dot marking system in which the dots generated by laser beam application construct a unit cell by being arranged vertically and horizontally in n×n or n×m (n, m are integers), or a vector marking system in which a unit cell is formed by filling each area with vertical, horizontal and oblique lines.

15. Method for forming a 2-dimensional code by laser marking according to claim 3 in which the 2-dimensional code is formed by either a dot marking system in which the dots generated by laser beam application construct a unit cell by being arranged vertically and horizontally in n×n or n×m (n, m are integers), or a vector marking system in which a unit cell is formed by filling each area with vertical, horizontal and oblique lines.

16. Method for forming a 2-dimensional code by laser marking according to claim 4 in which the 2-dimensional code is formed by either a dot marking system in which the dots generated by laser beam application construct a unit cell by being arranged vertically and horizontally in n×n or n×m (n, m are integers), or a vector marking system in which a unit cell is formed by filling each area with vertical, horizontal and oblique lines.

17. A laser marking device according to claim 8 in which the 2-dimensional code consists of a matrix type 2-dimensional code or a stack type 2-dimensional code.

18. A laser marking device according to claim 8 in which the 2-dimensional code is formed by either a dot marking system in which the dots formed by laser beam application construct a unit cell by being arranged vertically and horizontally in n×n or n×m (n, m are integers), or a vector marking system in which a unit cell is formed by filling each area with vertical, horizontal and oblique lines.

19. A laser marking device according to claim 10 in which the 2-dimensional code is formed by either a dot marking system in which the dots formed by laser beam application construct a unit cell by being arranged vertically and horizontally in n×n or n×m (n, m are integers), or a vector marking system in which a unit cell is formed by filling each area with vertical, horizontal and oblique lines.

* * * * *